United States Patent [19]
Aden et al.

[11] Patent Number: 5,680,577
[45] Date of Patent: Oct. 21, 1997

[54] METHOD AND SYSTEM FOR PROCESSING MULTIPLE REQUESTS FOR DATA RESIDING AT THE SAME MEMORY ADDRESS

[75] Inventors: Steven George Aden, Cedar Park; Kai Cheng; Jin Chin Wang, both of Austin; Ramanathan Raghavan, Round Rock, all of Tex.

[73] Assignee: International Business Machines Corporation, Armonk, N.Y.

[21] Appl. No.: 430,079

[22] Filed: Apr. 27, 1995

[51] Int. Cl.⁶ ........................................... G06F 13/14
[52] U.S. Cl. .................... 395/477; 395/478; 395/420
[58] Field of Search .............................. 395/474, 472, 395/478, 420, 477

[56] References Cited

U.S. PATENT DOCUMENTS

| | | | |
|---|---|---|---|
| 5,197,146 | 3/1993 | LaFetra | 395/471 |
| 5,226,146 | 7/1993 | Milia et al. | 395/468 |
| 5,339,397 | 8/1994 | Eikill et al. | 395/416 |
| 5,404,482 | 4/1995 | Stamm et al. | 395/435 X |

OTHER PUBLICATIONS

IBM TDB "Force Purge Table for Memory Directory Based Symmetric Multiprocessor Systems", vol. 37 No. 08, Aug., 1994, pp. 293–294.

*Primary Examiner*—David L. Robertson
*Attorney, Agent, or Firm*—Richard A. Henkler

[57] ABSTRACT

A method and system for processing multiple requests for data residing at the same memory address. The multiple requests are associated with an individual duplicate bit flag that indicates whether the request can be processed. Thus, manipulation of the duplicate bit flag controls the order of processing for each of the received requests, thereby maintaining data coherency and integrity.

6 Claims, 6 Drawing Sheets

METHOD AND SYSTEM FOR PROCESSING MULTIPLE REQUESTS FOR DATA RESIDING AT THE SAME MEMORY ADDRESS

BACKGROUND

1. Field of the Present Invention

The present invention relates in general to data processing systems, and in particular, to a system and method for processing multiple requests for data residing at the same memory address.

2. History of Related Art

In a traditional Symmetrical Multi-Processor (SMP) system, data coherency is maintained by a relatively time consuming but effective procedure. For example, if a requestor (e.g., a central processing unit ("CPU"), or an input/output ("I/O") unit within the system desires a particular portion of data (e.g., a cache line), it will first determine whether or not the requested data is located within its local cache. If the data is not within the local cache of the requester, then a Load Miss (or Read Miss) request is sent to a memory unit, which controls memory for the SMP system, requesting that the data be supplied to the CPU from the system memory.

In directory-based memory units, the memory unit includes a directory that indicates whether or not the latest copy of the requested data is located within system memory, or whether a particular CPU within the SMP system currently has ownership of the most recent version of the requested data.

Typically, multiple coherent transactions received by the memory unit are required to be processed so that the data coherency for the data processing system is maintained. The problem of data coherency occurs when the memory unit receives two different requests for the same cache block address. If the requests are processed out of order, then the data coherency of the data processing system is corrupted. Several methods are typically used for maintaining data coherency in a memory unit. One such method involves processing each received coherent transaction one at a time. Although this method maintains data coherency, it is inefficient and impractical. For example, if a second received coherent transaction addresses a different cache block than the first, then the second coherent transaction could be processed without corrupting data coherency or integrity, thus, valuable resources are wasted.

It would, therefore, be a distinct advantage to have an efficient method and system for managing multiple coherent transactions received by a memory unit of a data processing system while maintaining data coherency and integrity. The present invention provides such a method and system.

SUMMARY OF THE PRESENT INVENTION

In certain embodiments, the present invention includes methods and systems for processing multiple coherent transactions which belong to the same congruent class (i.e., the set to which the directory maps the memory address to).

In one such embodiment, the present invention is a method for processing multiple requests for data residing at the same memory address. The method begins by processing a first request for data residing at a unique memory address. During the processing of the first request, a second request is received for data residing at the same unique address. The processing of the second request is delayed until the processing of the first request is complete. Upon completion of the processing of the first request, the second request is processed.

In yet another embodiment, the present invention is a data processing system for processing multiple requests for data residing at the same memory address. The data processing system includes a plurality of requestor units. The plurality of requester units generating a first request and a second request for data residing at the same unique memory address. The data processing system further includes communication means, coupled to each one of the plurality of requestor units, for communicating the first and second requests. The data processing system also includes a memory unit comprising memory, coupled to the communication means, for controlling access to the memory. The memory unit includes means for receiving and storing the first and second requests, and means for processing the first and second requests. The memory unit also includes means for delaying the processing of the second request until the processing of the first request is complete. The memory unit further includes means for processing the second request upon completion of processing the first request.

BRIEF DESCRIPTION OF THE DRAWINGS

The present invention will be better understood and its numerous advantages will become more apparent to those skilled in the art by reference to the following drawings, in conjunction with the accompanying specification, in which.

DETAILED DESCRIPTION OF THE PRESENT INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
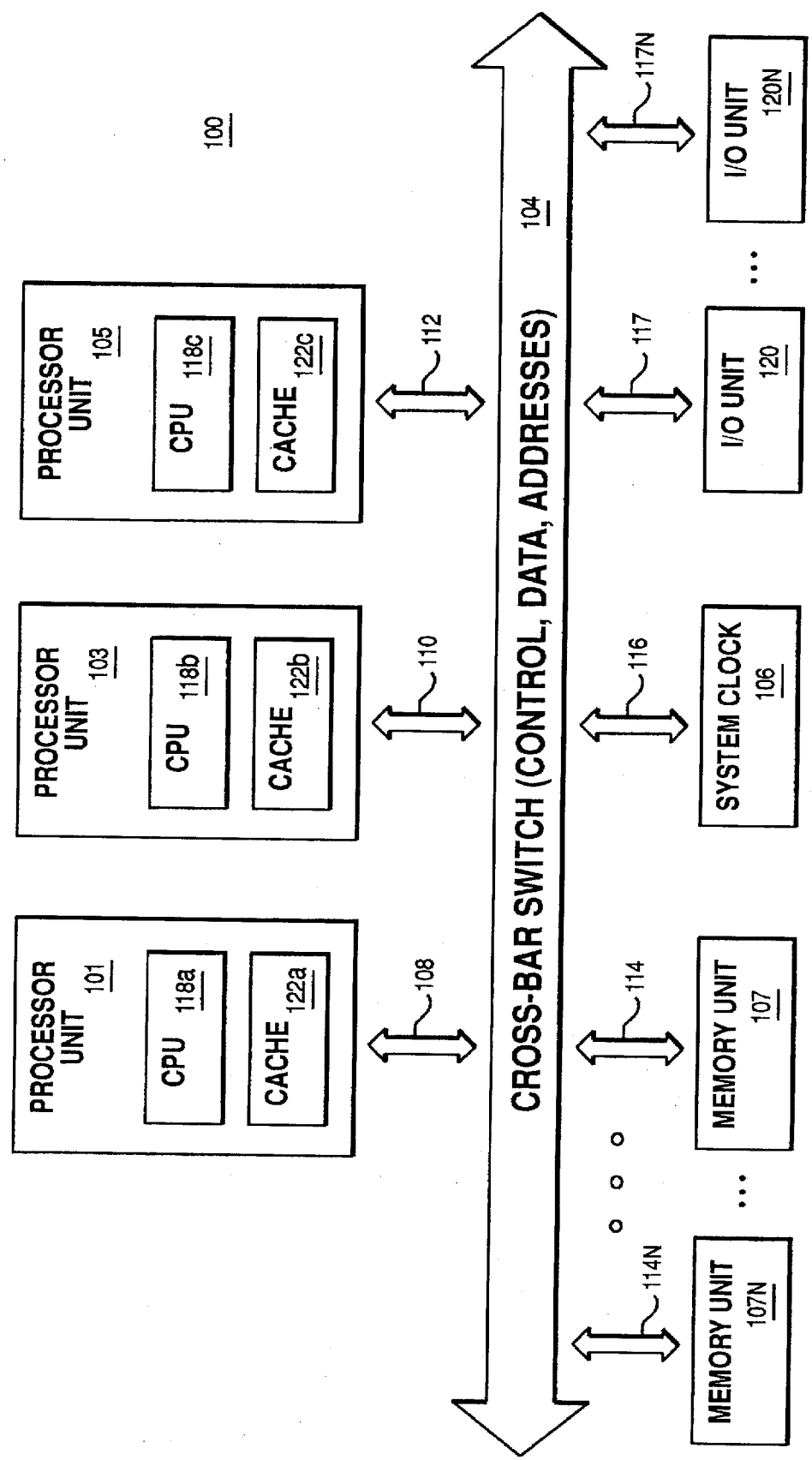
FIG. 1 is a schematic diagram of a symmetrical multi-processor system having a memory unit in which the present invention is practiced.

Referring now to FIG. 1, a schematic diagram is shown of a Symmetrical Multi-Processor system (SMP) 100 in which the present invention is practiced. The SMP 100 includes a plurality of processor units 101, 103, and 105, a System clock 106, a plurality of Input/Output (I/O) devices 120 through 120N, and a plurality of memory units 107 through 107N. Communication for the SMP 100 is implemented via cross-bar switch 104, which is coupled to each one of the plurality of processor units 101, 103, and 105, the system clock 106, each one of the plurality of I/O devices 120 through 120N, and each one of the plurality of memory units 107 through 107N, via bi-directional connections 108, 110, 112, 116, 117 through 117N, and 114 through 114N, respectively.

Each one of the processor units 101, 103, and 105 includes a Central Processing Unit (CPU) 118a, 118b, and 118c, respectively. In addition, each one of the processor units 101, 103, and 105 also include a local cache memory 122a, 122b, and 122c, respectively. The local cache memory 122a–122c may be, for example, a level one or level two cache. Cache memory is, typically, a relatively small high speed memory unit in which active portions of program instructions and/or data are stored.

Figure 2:
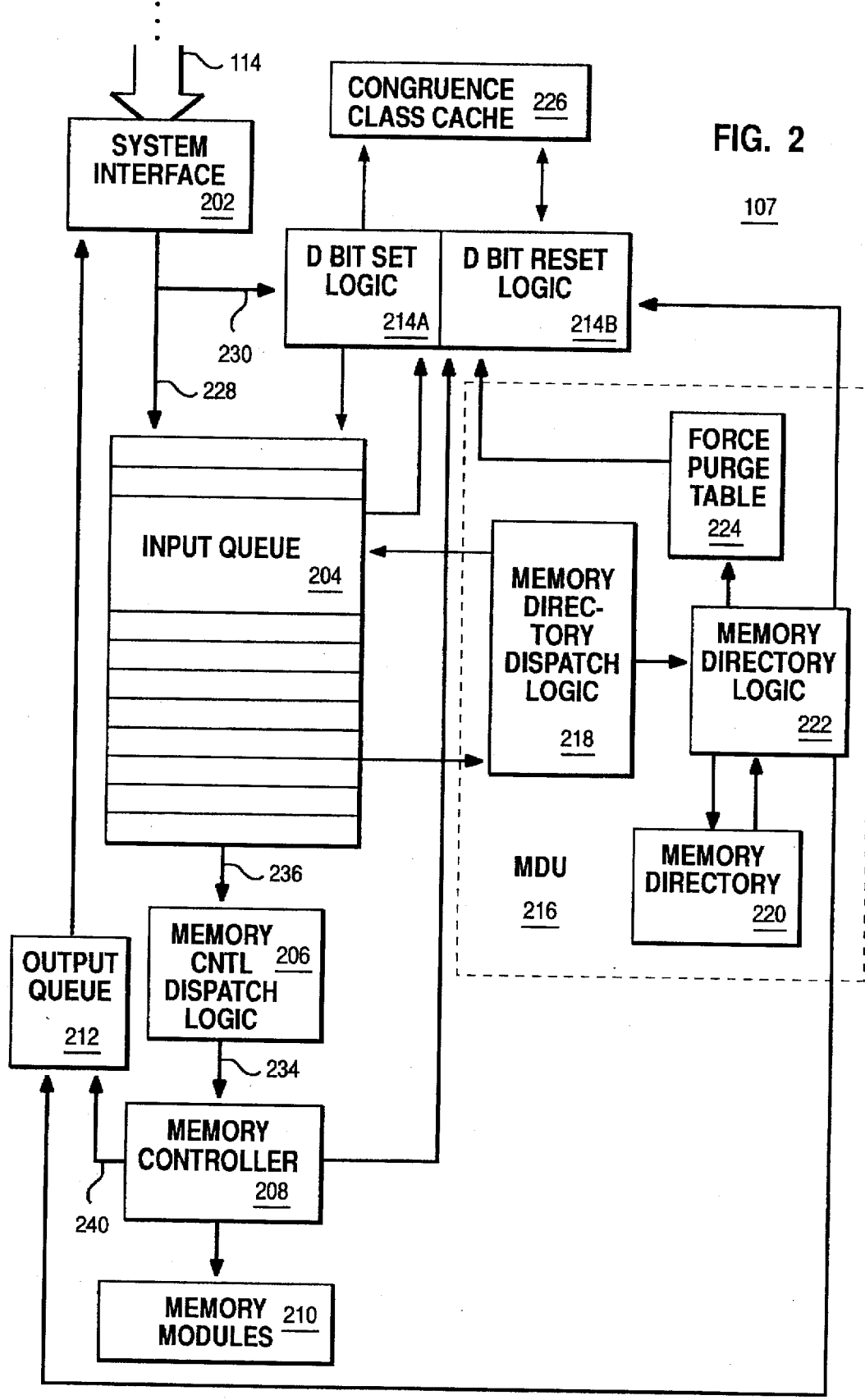
FIG. 2 is a schematic diagram illustrating in greater detail the various components of one of the plurality of memory units of FIG. 1 according to the teachings of the present invention.

Reference is now made to FIG. 2, a schematic diagram is shown for illustrating in greater detail the various components of the memory unit 107 of FIG. 1 according to the teachings of the present invention. The memory unit 107 comprises a system interface 202, D bit set logic 214A, D bit reset logic 214B, a Congruence Class Cache (CCC) 226, a Memory Directory Unit (MDU) 216, an input queue 204, memory control dispatch logic 206, a memory controller 208, memory modules 210, and an output queue 212. A brief summary of the various operations and functions for each one of the memory unit 107 components is enumerated below.

System interface 202 receives transactions from any one of plurality of the processor units 101, 103, 105, or any one of the plurality of I/O devices 120 through 120N, and processes outgoing information stored within the output queue 212. Transactions received by the system interface 202 may be identified as either coherent or non-coherent. Coherent transactions, as referred to hereinafter, are transactions which require a correct order of memory access. Non-coherent transactions, as referred to hereinafter, refer to those transactions which do not require a correct order of memory access.

Input queue 204 stores coherent and non-coherent transactions received and processed by the system interface 202. D Bit set logic 214A sets Duplicate Bit (DB) flags associated with received coherent transactions. D Bit reset logic 214B resets DB flags associated with coherent transactions stored within the input queue 204.

MDU 216 includes memory directory dispatch logic 218, a force purge table 224, memory directory logic 222, and a memory directory 220. MDU 216 manages and processes coherent transactions stored within the input queue 204. The memory directory 220 stores a plurality of Congruence Class Directory (CCD) entries for storing information concerning cache lines belonging to the same Congruence Class (CC). A Congruence Class (CC), as referred to hereinafter, defines all cache lines which have addresses with the same bit patterns at predefined bit positions.

The term congruent class can be considered similar to the term "set" as used to define "set-associative caches". Set-associative caches are explained in detail in the book "Computer Architecture: A Quantitative Approach" (section 8.3, pages 408–414), by J. L. Hennessy and D. A. Patterson, which is hereby incorporated by reference herein. In an n-way set-associative cache, each set contains up to n entries. Similarly, in an n-way congruent class memory directory design, each congruent class contains up to n entries.

Figure 3:
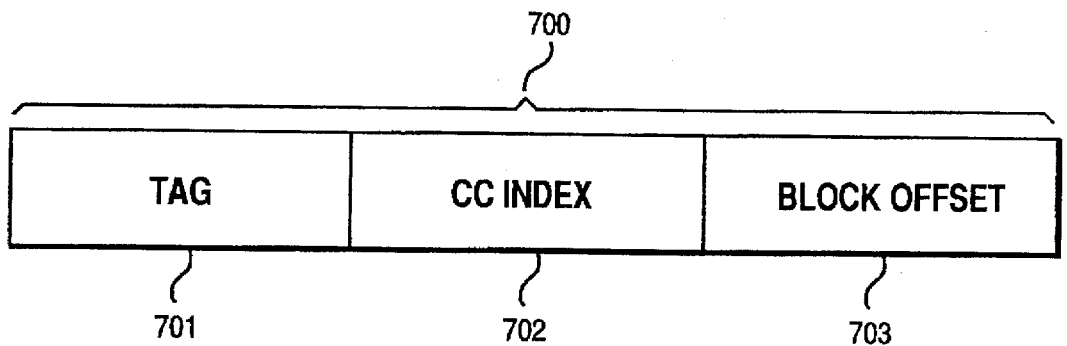
FIG. 3 is a block diagram illustrating three fields of a congruent class memory directory data structure used by the symmetrical multi-processor system of FIG. 1 according to the teachings of the present invention.

Reference now being made to FIG. 3, a block diagram is shown illustrating three fields of a congruent class memory directory 220 data structure (CCD) 700 used by the SMP 100 of FIG. 1. The congruent class memory directory data structure 700 includes a block offset field 703, a congruent class (CC) index field 702, and tag filed 701. The block offset field 703 is an address of the desired data within a cache block. The CC index field 702 is an index of the congruent class to which the address is mapped to. The Tag field 700 is used to search all the entries in a chosen congruent class for an exact match. The number of bits used to specify the CC Index field 702 is determined by the number of congruent classes in the memory directory. For example, a k-bit CC index field 702 implies that the memory directory has 2**k congruent classes.

In the preferred embodiment of the present invention, the predefined bit position is an eighteen bit Congruence Class (CC) field. Each one of the CCD entries includes a CC field, four cache line fields, and an address tag field. Each one of the cache line fields includes four sectors (cache line) and Exclusive-Shared-Invalid (ESI) ownership status for each one of the four sectors.

Memory control dispatch logic 206 determines how to dispatch transactions received from the input queue 204. Memory controller 208 controls access to the memory modules 210. Output queue 212 stores information resulting from the processing of coherent and noncoherent transactions stored within the input queue 204. The stored information is then relayed to the appropriate component within the SMP system 100 via system interface 202.

Congruence Class Cache (CCC) 226 stores entries (Congruence Class Cache entries) containing information pertaining to coherent transactions of the same Congruence Class (CC) which are stored within the input queue 204. The size of the CCC 226 is equal to the size of the input queue 204, plus the number of transactions which can be held in the memory controller 208 pipeline (pipeline size). The addition of the pipeline size to the CCC 226 is required, since the memory controller 208 may still be processing a transaction that has been dispatched (removed) from the input queue 204, and different coherent transactions may be in each of the pipeline registers.

Figure 4:
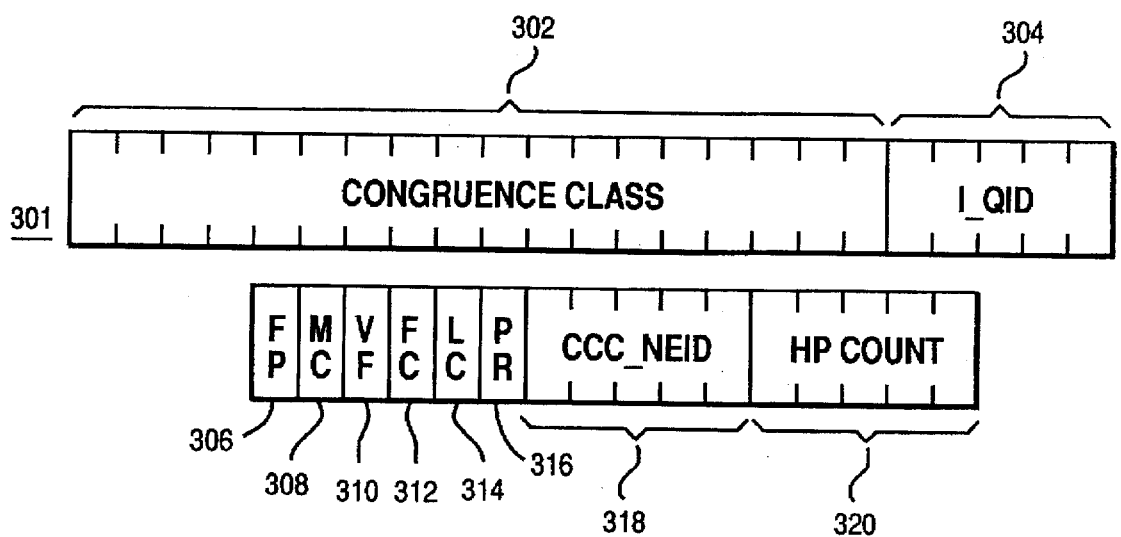
FIG. 4 is a block diagram illustrating the structure of a Congruence Class Cache (CCC) entry stored within the Congruence Class Cache of FIG. 2 according to the teachings of the present invention.

Referring now to FIG. 4, a block diagram is shown which illustrates the structure of a Congruence Class Cache (CCC) entry 301 stored within the Congruence Class Cache 226 of FIG. 2 according to the teachings of the present invention. In the preferred embodiment of the present invention, eighteen bits define a Congruence Class as indicated by Congruence class field 302. It would, however, be obvious to a person of ordinary skill in the art to use various sizes of bit patterns to define a Congruence Class without departing from the scope of the present invention.

The CCC entry 301 includes the following additional fields: an input queue identification pointer (I_QID) 304, a Force Purge Process indicator (FP) 306, a memory controller completed process indicator (MC) 308, a valid entry indicator (VF) 310, a first in a chain of CCC entries indicator (FC) 312, a last in a chain of CCC entries indicator (LC) 314, a Pending Reset (PR) indicator 316 for the pending reset of the DB flag associated with the input queue entry pointed to by the I_QID 304 field.

A more detailed description of the various functions and operations of the memory unit 107 components is provided hereinafter.

Referencing FIG. 2 again, coherent and non-coherent transactions are received and processed by the memory unit 107 via the system interface 202 which is coupled to bi-directional connection 114. Each one of these received transactions are associated with a Duplicate Bit (DB) flag and stored within the input queue 204 via unidirectional path 228. Before any of these transactions is stored, however, the D bit set logic 214A monitors for coherent transactions via uni-directional path 230.

Figure 5:
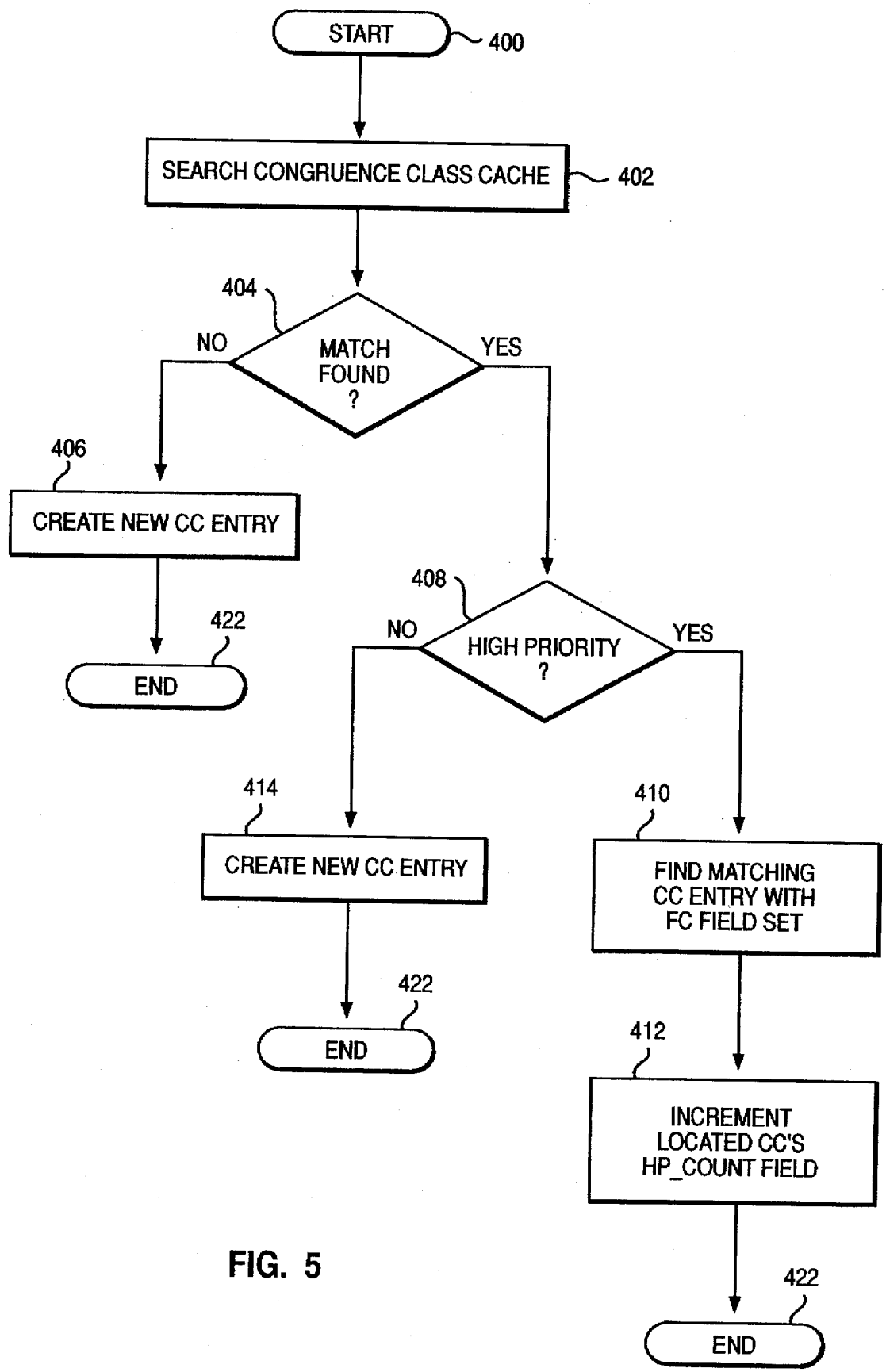
FIG. 5 is a flow chart which illustrates the processing of a detected coherent transaction by the duplicate bit set logic of FIG. 2 according to the teachings of the present invention.

Referring now to FIG. 5, a flow chart is shown which illustrates the processing of a detected coherent transaction by the DB set logic 214A of FIG. 2 according to the teachings of the present invention. The process begins at step 400 upon detecting a coherent transaction, and proceeds to step 402 where the Congruence Class Cache (CCC) 226 is searched for a CCC entry having a Congruence class 302 which matches that of the coherent transaction. Thereafter, the process proceeds to step 404 where it is determined whether or not a matching CCC entry was found. If, at step 404, it is determined that no matching CCC entry exist within the CCC 226, then the process proceeds to step 406 where a new CCC entry is created and initialized. The new CCC entry is initialized as follows:

(1) the I_QUD 304 field is initialized to point to the QUD position where the coherent transaction is to be stored within the input queue 204;

(2) the FP 306, MC 308, CCC_NEID 318, and HP_Count fields are initialized to zero; and (3) the FC 312 and LC 314 fields are set to one (indicating that this is the first and last entry of the Congruence class).

Thereafter, the process proceeds to end at step 422 by storing the new CCC entry in the CCC cache 226. If, however, a matching CCC entry is found, at step 404, then the process proceeds to determine whether or not the coherent transaction is a high priority coherent transaction at step 408. A high priority coherent transaction is a Cast Out or a Reset Inclusion. A Cast Out transaction is issued by a local cache memory 122a or system element, other than the memory unit 107, which has exclusive ownership of a modified cache line. The local cache memory 122a or system element is returning the modified data and ownership information to the memory unit 107. A Reset Inclusion transaction is issued by a local cache memory 122a or system element which holds a copy of an unmodified cache line. The local cache memory 122a or system element is notifying the MDU 216 that is returned the status of the cache line to Invalid.

With continuing reference to FIG. 5, if, at 408, the coherent transaction is determined to be high priority, i.e. a Reset Inclusion or Cast Out, then the process proceeds to step 410, where the DB Set Logic 214A searches the CCC 226 for a matching CCC entry having its FC 310 field set. Thereafter, the process proceeds to increment the located CC entry's HP_Count 320 at step 412. The process then proceeds to end at step 422 by saving the high priority coherent transaction in the input queue 204.

If, however, the coherent transaction is determined, at 408, not to be high priority, then the process performs the following tasks at step 414:

(1) creates a new CCC entry in the CCC 226;

(2) the CCC_NEID field 318 of the matching CCC entry with the LC bit 314 set is loaded with the CCC entry address of the new entry;

(3) the LC bit 314 is set in the new CCC entry;

(4) the LC bit 314 is reset in the matching CCC entry; and (5) the DB flag associated with the coherent transaction is set in the input queue 204. Thereafter, the process proceeds to end at step 422 by storing the coherent transaction in the input queue 204.

Once a transaction has been stored within the input queue 204, it is processed by the MDU 216 and/or the memory control dispatch logic 206 depending upon whether it is coherent or non-coherent. Non-coherent transactions are processed by the memory control dispatch logic 206 via uni-directional path 236 and the memory controller 208 via uni-directional path 234. The memory controller 208 may place processing information from the non-coherent transaction in the output queue 212 via uni-directional path 240 depending upon whether such information is required by the SMP 100.

Figure 6:
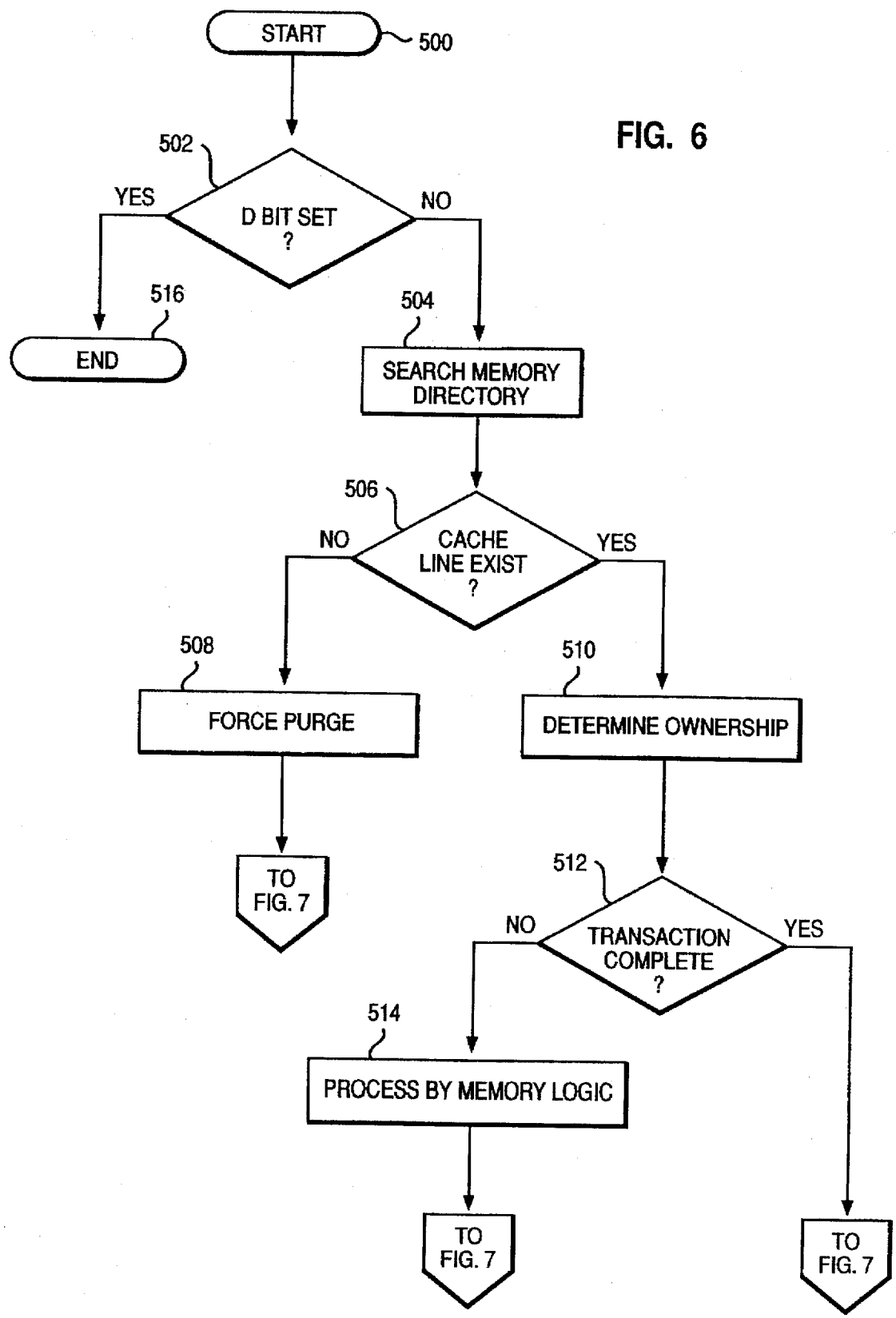
FIG. 6 is a flow chart illustrating the steps for processing a coherent transaction stored within the input queue of FIG. 2 according to the teachings of the present invention.

Referring now to FIG. 6, a flow chart is shown for illustrating the steps for processing a coherent transaction stored within the input queue 204 of FIG. 2 according to the teachings of the present invention. The method begins at step 500 by having the memory directory dispatch logic 218 monitor for a coherent transaction stored within the input queue 204. Upon the detection of a stored coherent transaction within the input queue 204, the method proceeds to step 502 where it is determined whether or not the DB flag associated with the coherent transaction is set. If, at step 502, it is determined that the DB flag is set, then the method proceeds to end at step 516.

If, however, at step 502, it is determined that the DB flag is not set, then the method proceeds to step 504 where the memory directory 220 is searched for a matching CCD entry. Thereafter, the method proceeds to step 506 where it is determined whether or not a matching cache line exists within the CCD entry for the specified address. If, at 506, it is determined that a matching cache line does not exist within the CCD entry, and the CCD entry is full, then the method proceeds to perform a force purge on the CCD entry, at step 508. The method then proceeds to the D bit reset logic, which is explained in greater detail in connection with FIG. 7.

A force purge is a process by which a cache line field within a CCD entry is removed and invalidated in order to make room for a new transaction-to be processed which addresses the same Congruence Class (CC). One cache line entry from the CCD entry is chosen and moved to the Force Purge Table (FPT) 224. In the preferred embodiment of the present invention the FPT 224 contains sixteen possible entries. The MDU 216 then issues a force purge transaction to all holders of the cache line. The holders of the cache line respond by issuing a Reset Inclusion if the cache line is held as shared, or exclusive and unmodified. If the cache line is held exclusively and modified the holder of the cache line responds by issuing a Cast Out. If the holder had already issued a Cast Out or a Reset Inclusion before receiving the force purge request, the holder acknowledges the force purge request with an acknowledgment reject message.

With continuing reference to FIG. 6, if, however, at step 506, it is determined that a matching cache line exists within the CCD entry, then the method proceeds to step 510 where the memory directory logic 222 determines ownership of the specified address. Action can be taken if necessary, by sending new cross-interrogations to the current owners of the addressed cache block. The coherent transaction is said to be complete when the system state is coherent with respect to the coherent transaction. Thereafter, the method proceeds to step 512 where it is determined whether or not the coherent transaction is complete, i.e., no further action is required by the memory unit 107. If, at 512, it is determined that the coherent transaction is complete, then the method proceeds to the D Bit reset logic 214B, which is explained in greater detail in connection with FIG. 7. If, however, at 512, it is determined that the coherent transaction is not complete, then the method proceeds by having the transaction processed by the memory control dispatch logic 234, and the memory controller 208. Thereafter, the method proceeds to D bit reset logic 214B as explained in connection with FIG. 7.

Figure 7:
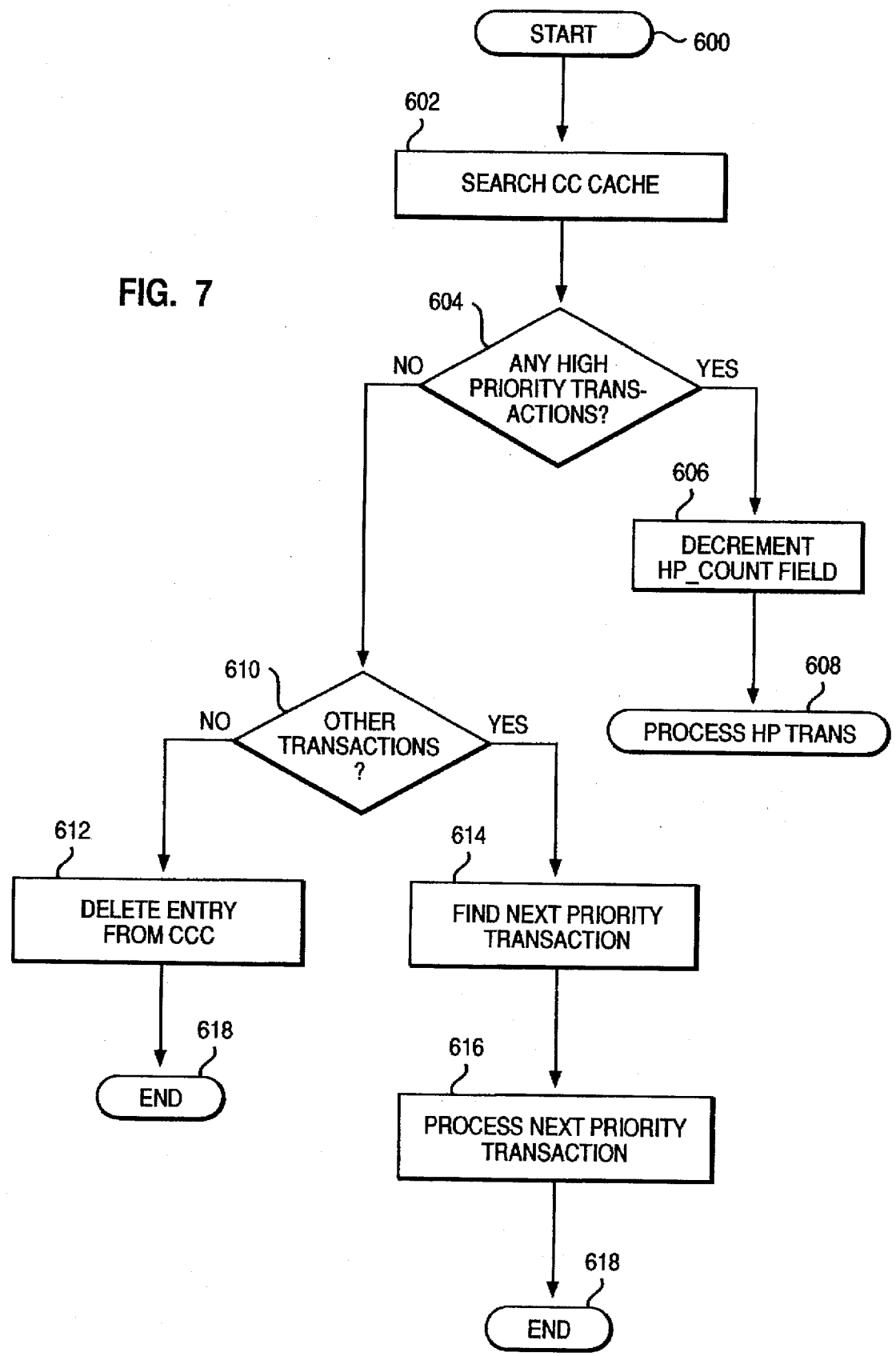
FIG. 7 is a flow chart illustrating the process for resetting a duplicate bit flag associated with a coherent transaction stored within the input queue of FIG. 2 according to the teachings of the present invention.

Reference now being made to FIG. 7, a flow chart is shown which illustrates the process for resetting a Duplicate Bit (DB) flag associated with a coherent transaction stored within the input queue 204 of FIG. 2 according to the teachings of the present invention. The method begins at step 600 upon the receipt of a coherent transaction within the D bit reset logic 214B, and proceeds to step 602 where the CCC 226 is searched for the CC entry having a CC field 302 which matches the coherent transaction. Thereafter, it is determined whether or not any high priority coherent transactions of the same congruent class are stored within the input queue 204 and awaiting processing at step 604. If, at step 604, it is determined that there are high priority coherent transactions of the same CC stored within the input queue 204, then the method proceeds to decrement the HP_Count field 320 of the matching CC entry. The method then proceeds to end at step 608 by processing the next high priority coherent transaction stored within the input queue 204.

If, however, at 604, it is determined that there are no CC high priority transactions stored within the input queue 204, then the method proceeds to step 610. At step 610, the CCC 226 is searched to determine if any other low priority CC transactions are stored within the input queue 204. If, at 204, it is determined that no other low priority CC transactions exist, then the method proceeds to step 612 where the CCC entry is removed from the CCC 226. Thereafter, the method proceeds to end at step 618. If, however, at step 610, it is determined that other low priority CC coherent transactions exist, then the method proceeds to step 614 where the next CCC entry is located and its PR 13 field is set. The setting of the PR 13 field invokes additional logic in which access to the input queue 204 for updating the transaction identified by I_QUID 304 field is requested. Once permission is granted the DB flag associated with the low priority coherent transaction is reset providing for its processing by the MDU 216, and the PR 316 field of the next CCC entry is reset. Thereafter, the method proceeds to end at step 618.

It is thus believed that the operation and construction of the present invention will be apparent from the foregoing description. While the methods and/or systems shown and described herein have been characterized as being preferred, it will be readily apparent that various changes and/or modifications could be made therein without departing from the spirit and scope of the present invention as defined in the following claims

What is claimed is:

1. A method of processing multiple requests for data residing at the same memory address, the method comprising the steps of:

processing a first request for data residing at a unique address;

receiving, during the processing of the first request, a second request for data residing at the unique address;

searching, in response to receiving the first request, a congruence class cache for an entry identifying the unique address;

creating, in response to not finding an identifying cache entry, a first entry in the congruence class cache, the first entry identifying the unique memory address and the first request;

searching, in response to receiving the second request, the congruence class cache for an entry identifying the unique address;

creating, in response to finding the first cache entry, a second cache entry in the congruence class cache, the second cache entry identifying the unique memory address and the second request;

linking the second cache entry to the first cache entry;

associating, in response to finding the first cache entry, the second request with a duplicate bit flag, the duplicate bit flag indicating that the second request cannot be processed;

re-setting, upon completion of the processing of the first request, the duplicate bit flag to indicate that the second request can be processed; and upon completion of processing the first request, processing the second request.

2. The method of claim 1, wherein said second request is a high priority request, said first entry includes a high priority counter, and said method further comprises the step of:

incrementing, in response to finding said first cache entry, said high priority counter.

3. The method of claim 2, wherein said step of re-setting includes the steps of:

searching, upon completion of said processing of said first request, said congruence class cache for an entry identifying said unique memory address;

decrementing, in response to finding said first cache entry, said high priority counter; and re-setting, in response to finding said first cache entry, said duplicate bit flag to indicate that said second request can be processed.

4. A data processing system for processing multiple requests for data residing at the same memory address, the data processing system comprising:

a processor unit generating a first request for data residing at a unique memory address;

an input/output unit generating a second request for data residing at the same unique memory address, the second request being a high priority request;

communication means, coupled to the processor unit and input/output unit, for communicating the first request and the second request;

a memory unit comprising memory, coupled to the communication means, for controlling access to the memory, the memory unit further comprising:

means for receiving and storing the first request and the second request;

means for searching a congruence class cache for an entry identifying the unique memory address;

means for creating, in response to not finding an identifying cache entry, a first cache entry in the congruence class cache, the first cache entry identifying the unique memory address, and including a high priority counter;

means for incrementing the high priority counter;

means for processing the first request and the second request;

means for creating, in response to finding the first cache entry, a second cache entry in the memory address cache, the second cache entry identifying the unique memory address and the second request;

means for linking the second cache entry to the first cache entry;

means for associating, in response to finding the first cache entry, the second request with a duplicate bit flag, the duplicate bit flag indicating that the second request cannot be processed;

means for re-setting, upon completion of the processing of the first request, the duplicate bit flag to indicate that the second request can be processed; and means for processing the second request upon completion of processing the first request.

5. The data processing system of claim 4 wherein said means for re-setting includes:

means for searching, upon completion of said processing of said first request, said congruence class cache for an entry identifying said unique memory address;

means for decrementing, in response to finding said first cache entry, said high priority counter; and means for re-setting, in response to finding said first cache entry, said duplicate bit flag to indicate that said second request can be processed by said memory unit.

6. A method of processing, in a memory unit of a data processing system, multiple requests for data residing at the same memory address, said memory unit including a memory directory unit, an input queue, and a congruent class cache, said method comprising the steps of:

receiving, in said memory unit, a first request for data residing at a unique memory address;

associating said first request with a first duplicate bit flag, said first duplicate bit flag indicating whether said first request can be processed by said memory directory unit;

searching said congruent class cache for an entry identifying said unique memory address;

creating, in response to not finding an identifying congruent class cache entry, a first congruent class entry in said congruent class cache, said first congruent class entry identifying said unique memory address and a location in said input queue to which said first request is stored;

storing said first request and said first duplicate bit flag in said input queue;

processing said first request with said memory unit;

receiving, in said memory unit, during said processing of said first request, a second request for data residing at said unique memory address;

associating said second request with a second duplicate bit flag, said second duplicate bit flag indicating whether said second request can be processed by said memory directory unit;

searching said congruent class cache for an entry identifying said unique memory address; and creating, in response to finding said first congruent class cache entry, a second congruent class cache entry in said congruent class cache, said second class cache entry identifying said first request and the location in said input queue to which said second request is stored;

setting said second duplicate bit flag, in response to finding said first congruent class cache entry, to indicate that said second request cannot be processed by said memory unit;

storing said second request and said second duplicate bit flag in said input queue;

re-setting said second duplicate bit flag upon the completion of said processing of said first request by said memory unit; and processing said second request with said memory unit.

* * * * *